INVENTOR.
John P. Arndt Jr

INVENTOR.
John P Arndt Jr

INVENTOR.
John P. Arndt Jr.

INVENTOR.
John P Arndt Jr

April 29, 1952 J. P. ARNDT, JR 2,594,841

PIEZOELECTRIC TRANSDUCER WITH PUSH-PULL AND FEEDBACK CIRCUIT

Filed Aug. 11, 1945 5 Sheets-Sheet 5

INVENTOR.

John P. Arndt Jr.

Patented Apr. 29, 1952

2,594,841

UNITED STATES PATENT OFFICE 2,594,841

PIEZOELECTRIC TRANSDUCER WITH PUSH-PULL AND FEEDBACK CIRCUIT

John P. Arndt, Jr., Euclid, Ohio, assignor to The Brush Development Company, Cleveland, Ohio, a corporation of Ohio Application August 11, 1945, Serial No. 610,361

2 Claims. (Cl. 179—100.4)

This invention relates to piezoelectric transducers and transducer systems and more particularly, to piezoelectric "motor" transducers, i. e. transducers of the type adapted to convert electrical energy into mechanical energy.

More specifically stated, this invention relates to piezoelectric devices such as pen recorders and the like exemplified by the United States patent to C. K. Gravley, No. 2,244,690, to loud speakers and the like, exemplified by the United States patent to A. L. W. Williams, No. 2,105,011 and, in fact, to all apparatus wherein piezoelectric units are employed for translating alternating electrical potentials or currents into vibratory mechanical forces or displacements and it relates especially to such apparatus employing piezoelectric units having undesirable nonlinear and temperature effects.

It has been found that the dielectric constant, the "sensitivity," and the "linearity" of piezoelectric materials of the Rochelle salt type exhibit marked changes when the temperature thereof passes through values normally encountered in operation causing objectionable alterations in performance. In the design of a piezoelectric device it is common practice to choose a piezoelectric unit such that, when it is mounted and loaded, the first resonance frequency lies near the upper end of the frequency range over which the device is intended to operate. Such a device is stiffness controlled over most of its frequency range. Due to the nature of piezoelectric units the amplitude of vibration of such stiffness controlled devices is proportional (neglecting certain nonlinear effects) to the applied voltage and independent of frequency over most of the frequency range below the resonance frequency. In a device such as a pen recorder it is desirable to have the amplitude of vibration independent of frequency and so it is the usual practice to drive the recorder from an amplifier whose internal impedance is low compared with the crystal impedance over most of the frequency range. This makes the voltage applied to the crystal proportional to the amplifier input voltage, the current drawn by the crystal depending on the crystal impedance which, well below the first resonance of the piezoelectric unit, is essentially the impedance of a condenser. In the case of a piezoelectric phonograph record cutter it often is desirable to have, for a given input voltage to the amplifier, the amplitude of vibration of the recording stylus independent of frequency up to about 500 cycles and to have the amplitude vary in inverse proportion to the frequency above 500 cycles. To obtain this characteristic it is the usual practice to design the amplifier output circuit so that its effective series resistance as viewed from the crystal terminals is equal to the capacitive reactance of the crystal at 500 cycles. This makes the voltage applied to the crystal and thus the crystal amplitude proportional to the amplifier input voltage for frequencies below 500 cycles and inversely proportional to frequency for frequencies above 500 cycles.

The above described circuit arrangements are not entirely satisfactory because of certain undesirable characteristics of the piezoelectric units. One undesirable characteristic of Rochelle salt crystal units, insofar as the prior art circuits are concerned, is that at room temperatures, the vibration is not linearly related to the applied voltage. This results in inaccuracies in the recordings made by a pen recorder, and in audible distortion in the reproduction of phonograph records recorded with such a Rochelle salt record cutter. Similarly, distorted recordings result when a Rochelle salt piezoelectric vibration electrometer is employed to make oscillographic film recordings or sound film recordings. Another undesirable characteristic is that the amplitude of vibration of the crystal device for a given applied voltage varies when the temperature varies. In the case of Rochelle salt devices, the sensitivity is at a maximum at room temperatures and falls off greatly as the temperature is raised to a maximum of about 40° C. The variation in sensitivity may be as much as ten to one or even greater.

The electrical impedance of a piezoelectric device at frequencies well below the first mechanical resonance of the device is approximately the same as the impedance of a condenser. However, as the frequency is increased toward the resonant frequency of the crystal device, the impedance falls more rapidly than does the impedance of a condenser, reaching at or near resonance a more or less sharp minimum value depending on the mechanical damping and then, as the frequency is further increased, the impedance rises to a high value and then drops again to a value somewhat above that of a condenser representing the low frequency impedance. At still higher frequencies further minimum and maximum values of impedance may be observed. In most transducer applications of piezoelectric units only the first resonance frequency falls within or near the useful frequency range of the device. For many purposes, including the design of circuits to carry out my invention, it usually is satisfactory to treat the piezoelectric device as having the impedance of a pure capacity and in the following specification and claims I shall refer to the crystal impedance as though this were actually the case, but it should be understood that reference to crystal capacity is not to be taken in a limiting sense.

The capacity of a piezoelectric device of the Rochelle salt type varies markedly as the temperature varies, the maximum value for Rochelle salt being at about room temperature. This effect is especially undesirable in devices such as record cutters used as described above since the desired frequency response is obtained by matching the circuit resistance to the crystal capacity at the "turn over" frequency. When the capacity changes, the turn over frequency also changes, unless the circuit resistance is correspondingly altered.

It has been found that the vibratory displacement of a piezoelectric crystal such as a Rochelle salt crystal is substantially linearly related to the electrical charge, or time integral of the current delivered to the crystal. Furthermore, the ratio of the amplitude of vibration to the amplitude of the alternating charge delivered to the crystal is substantially independent of temperature.

In the past it has been possible to take advantage of this property by placing in series with the crystal a condenser whose capacity is small compared with the crystal capacity. When this is done, the charge flowing in the crystal circuit is substantially independent of the crystal capacity and dependent substantially only upon the voltage applied to the circuit and the capacitance of the condenser. Linearity of operating and independence of temperature are thereby achieved. The frequency characteristic of such a circuit is qualitatively the same as for the more common prior art circuits since the condenser and the crystal both have approximately the same impedance-frequency relationship, i. e. the crystal impedance is approximately that of a condenser. With this arrangement the requirement for "flat" response in a device such as a pen recorder is that the amplifier resistance be small compared with the reactance of the crystal and condenser in series over the useful frequency range.

This series condenser arrangement has found little practical use because, to be effective, the condenser must have an impedance several times as large as the impedance of the crystal. As a result, the major part of the output voltage of the amplifier is developed across the series condenser and little is left for operating the crystal. This requires that the amplifier be capable of supplying several times as much voltage as is required by the crystal. Since many crystal motor devices require voltages measured in the hundreds, the use of the series condenser often requires the amplifier to deliver voltages measured in the thousands.

In the case of a device such as a phonograph record cutter connected in a circuit with high series resistance to obtain a gradual reduction in the ratio of stylus amplitude to amplifier input voltage as the frequency is increased, as described above, the resistance becomes the controlling impedance at the higher frequencies so that the current at the higher frequencies is substantially independent of the crystal impedance. Now the current in a circuit is the time differential of the change flowing in the circuit, and therefore, if the current is independent of the crystal impedance, the charge or time integral of the current also is independent of the crystal impedance. Thus the common record cutter circuit of the prior art provides linear operation and independence of temperature over the upper part of the frequency range of the cutter, but not over the lower part of the range. It should be emphasized that these remarks apply to the behavior of the piezoelectric unit itself and not necessarily to the behavior of the piezoelectric device as a whole since some piezoelectric devices embody added stiffness or mechanical resistance elements which in themselves are temperature dependent or nonlinear, or both.

With the foregoing considerations in mind, the primary object of this invention is to provide new means for compensating the nonlinearity of transducers of the Rochelle salt type and the detrimental effects of changing temperature upon such transducers.

Another object of this invention is to provide for use with piezoelectric motor devices having undesirable temperature and saturation effects, an amplifier that delivers to the piezoelectric device a signal current substantially independent of the crystal impedance, without undue sacrifice of amplifier output power capacity.

Another object is to provide for use, with piezoelectric motor devices having undesirable temperature and saturation effects, an amplifier having the beneficial effect of a small series condenser without the loss of output voltage encountered when a small series condenser is used.

Another object of this invention is to provide a novel piezoelectric unit, especially adapted for use with a push pull amplifier designed according to this invention.

Another object of this invention is to provide a piezoelectric motor-amplifier combination having a wider frequency range than conventional systems.

Another object is to provide a piezoelectric motor-amplifier combination for which the amplitude of vibration of the motor device is substantially independent of temperature.

Another object is to provide a piezoelectric motor-amplifier combination for which the mechanical vibration displacement of the motor device is substantially a linear function of the alternating voltage applied to the amplifier.

Another object is to provide such an amplifier-motor combination including means for obtaining a predetermined frequency characteristic.

Another object of the invention is to provide means whereby a piezoelectric motor device of the Rochelle salt type is protected from overload irrespective of the operating temperature of the crystal.

Another object is to provide means whereby an indication of the amplitude of vibration of a piezoelectric motor device of the Rochelle salt type may be obtained regardless of the operating temperature of the device.

The term "Rochelle salt type" as used in this specification and in the appended claims is intended to include all piezoelectric material that exhibits nonlinearity in the relationship between applied voltage and the resulting mechanical force, or displacement and all piezoelectric material that exhibits a marked change in sensitivity and capacity when the temperature of the material changes.

The term transducer as used in this specification and appended claims is intended to include devices such as electrometers that have mechanical displacement in response to applied electrical energy but which do not deliver any mechanical energy to an external load.

The novel features considered characteristic of the invention are set forth with particularity in the appended claims. The invention itself, however, both as to its organization and its method of operation, together with additional objects and advantages thereof, will best be understood from the following description of certain specific embodiments, when read in connection with the accompanying drawings, in which:

In accordance with the present invention, the bnefits of a small series condenser may be realized without the attendant loss of output voltage, thus eliminating the need for excessive amplifier output capacity. Furthermore, according to the present invention, frequency response correction, such as may be desired in the use of a crystal phonograph record cutter, may be realized with freedom from temperature effects and nonlinearity of the piezoelectric unit over the whole frequency range of the cutter.

Figure 1:
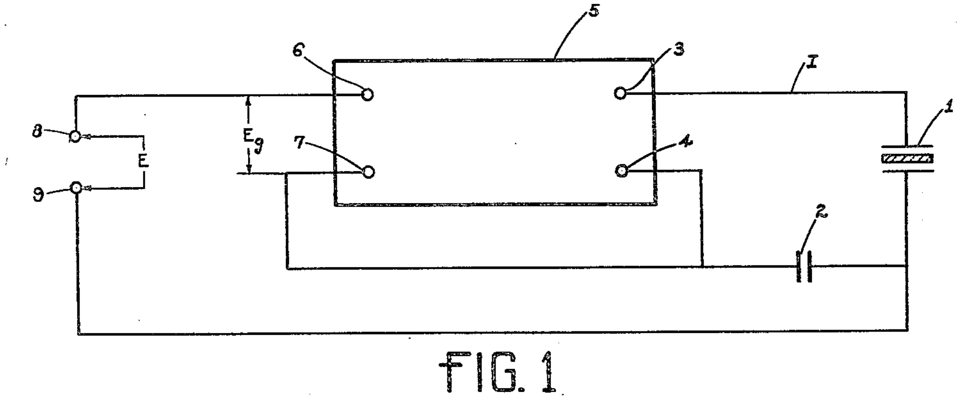
Fig. 1 is a diagram partly in block form illustrating the principle of operation of this invention.

Referring now to Fig. 1 of the drawings, there is shown in general form, a piezoelectric motor-amplifier system arranged according to the present invention. It functions as though a small condenser were placed in series with the piezoelectric unit but does not require the amplifier to deliver an output voltage greatly in excess of that required by the crystal unit.

A piezoelectric crystal device 1, shown for simplicity merely as a piezoelectric plate between two electrodes, is connected across the output terminals 3, 4 of an amplifier 5 in series with a condenser 2 whose impedance $Z^f$ is low compared with the impedance $Z^c$ of the crystal.

Piezoelectric device 1 may be any piezoelectric motor device but the invention is most useful with motor devices subject to the undesirable effects noted above. The crystal element may be a single plate of piezoelectric crystalline material provided with electrodes as shown in Sawyer Patents 1,802,780 and 1,802,781 or a combination of such plates connected together in aiding relationship or may be one or more multi-plate flexing elements of the type shown on Sawyer reissued patents Re. 20,213 and Re. 20,680 or any other arrangement of piezoelectric material adapted to receive electrical energy and to respond thereto.

The amplifier has input terminals 6, 7 and is of such design that the connection between input terminal 7 and output terminal 4 does not interfere with the operation of the amplifier. The voltage amplification preferably should be large compared with the ratio $Z_c/Z_f$ and preferably the amplifier should be relatively free of phase shift caused by coupling condensers, transformers, etc. The requirements in this respect are similar to the requirements of conventional inverse feedback amplifiers. The amplifier should be capable of delivering an output voltage at least slightly in excess of the maximum voltage required for operation of the crystal device. The input signal is applied between input terminal 6 of the amplifier and the junction of condenser 2 and crystal 1 so that condenser 2 is in series with the input signal applied between terminals 8 and 9.

The output current of the amplifier flows through crystal 1 and condenser 2 producing a voltage drop across condenser 2 which is proportional to the time integral of the crystal current. The "polarities" of the input and output terminals of the amplifier should be such that the drop across condenser 2 is in opposition to the input voltage. Since the impedance of condenser 2 is low compared with the crystal impedance, practically all of the output voltage of the amplifier appears across the crystal. By virtue of the feedback connection from condenser 2 to the input circuit, the output current is substantially independent of the impedance of crystal 1, with the result that the amplitude of vibration of the crystal is substantially independent of temperature and is substantially a linear function of the input voltage applying to the circuit. Qualitatively the action of the system may be explained as follows: Assume that the temperature of the crystal changes to decrease the crystal capacity, i. e. to increase the crystal impedance $Z_c$. This tends to reduce the current flow through the crystal 1 and condenser 2. This in turn reduces the feedback voltage developed across condenser 2 so that a larger portion of the circuit input voltage is applied to input terminal 6, 7 of the amplifier 5. This increased input causes a corresponding increase in output which tends to compensate for the current reducing effect of the increased crystal impedance.

The current drawn by the crystal tends to increase directly with frequency for a fixed temperature, and amplitude of signal between terminals 6 and 7. The voltage drop across condenser 2 decreases in inverse proportion to the frequency for a given current. Thus for a given input voltage the signal drop across condenser 2 tends to remain the same at all frequencies.

The behavior of the circuit may be expressed mathematically as follows: Let A be the voltage amplification of amplifier 5 with terminals 3, 4 open, i. e. the open circuit voltage amplification; let the input impedance between terminals 6 and 7 be large compared with the impedance of condenser 2; let the internal impedance of the amplifier measured at terminals 3 and 4 i. e. the open circuit output impedance be $Z_a$; let the impedance of crystal 1 be $Z_c$ and the impedance of condenser 2 be $Z_f$. Denote the input voltage to the circuit by E, the input voltage to the amplifier across terminals 6 and 7 by $E_g$ and the current through the crystal 1 and condenser 2 by I.

The voltage that would be developed across output terminals 3 and 4 when open circuited is:

$$AE_g \tag{1}$$

The load current is given by:

$$I=\frac{AE_g}{Z_a+Z_c+Z_f} \tag{2}$$

The input $E_g$ across terminals 6 and 7 is the difference between the circuit input E and the drop across condenser 2:

$$E_g=E-IZ_f \tag{3}$$

Substituting this in the expression for I (Equation 2), the current is given by:

$$I=\frac{AE}{Z_a+Z_c+(A+1)Z_f} \tag{4}$$

If the input were connected in the normal manner between terminals 6 and 7 rather than as shown in Fig. 1, the expression for the current would be:

$$I=\frac{AE}{Z_a+Z_c+Z_f} \tag{5}$$

Comparing the two expressions for the current and recalling that the crystal impedance $Z_c$ is much larger than the amplifier impedance $Z_a$ and the impedance $Z_f$ of the feedback condenser, and that the amplification A is much larger than the ratio $Z_c/Z_f$, it will be noted that in the conventional circuit (Equation 5) the current is substantially inversely proportional to the crystal impedance while in the circuit of this invention the current (Equation 4) is substantially independent of the crystal impedance, the current depending mostly on the amplification A and the impedance $Z_f$ of condenser 2. Since the impedance of a crystal is for practical purposes substantially the same as the impedance of a condenser the current in the circuit of Fig. 1 is substantially the same function of frequency as is the current in conventional crystal circuits. Thus the arrangement of Fig. 1 provides the same kind of frequency response as a conventional crystal circuit but provides substantial immunity from the nonlinear effects and the temperature effect usually encountered and yet it does not waste an appreciable part of the output voltage of the amplifier. To illustrate further the action of this invention, a typical case will be computed.

For practical purposes the impedance $Z_c$ of the piezoelectric unit 1 may be considered to be that of a condenser. The operation of the invention, however, is not limited to the use of a purely capacitive load. At room temperature the capacity of a typical multi-plate flexing crystal element such as might be used in a phonograph record cutter may be .01 mfd., and at 40° C. the capacity may be .002 mfd. For use with such a crystal element the feedback condenser 2 may have a capacity of .05 mfd. and the amplifier may have an open circuit voltage amplification of 100. The output impedance $Z_a$ of the amplifier may be small compared with the crystal impedance over the entire frequency range to be covered by the crystal device. Under these conditions the current at room temperature is given by:

$$I=\frac{AE}{\frac{1}{\omega\times10^{-8}}+101\frac{1}{\omega\times5\times10^{-8}}}=\frac{AE\omega\times10^{-8}}{21.2} \tag{6}$$

at 40° C. the current is given by:

$$I_{40}=\frac{AE}{\frac{1}{\omega\times0.2\times10^{-8}}+101\frac{1}{\omega\times5\times10^{-8}}}=\frac{AE\omega\times10^{-8}}{25.2} \tag{7}$$

the ratio of maximum to minimum current is:

$$\frac{25.2}{21.2}=1.19 \tag{8}$$

If the same crystal element and the same amplifier were used without the feedback connection of this invention, the current at room temperature would be:

$$I=\frac{AE}{\frac{1}{\omega\times10^{-8}}}=AE\omega\times10^{-8} \tag{9}$$

and the current at 40° C. would be:

$$I_{40}=\frac{AE}{\frac{1}{\omega\times0.2\times10^{-8}}}=0.2AE\omega\times10^{-8} \tag{10}$$

The ratio of maximum to minimum current in the conventional circuit is:

$$\frac{1}{0.2}=5 \tag{11}$$

Thus, without the use of the present invention, the current would vary with temperature over a range of 5:1. By employing the principle of this invention that large current variation is reduced to a very small value. In the above example the variation is reduced to only 1.19:1. Since the amplitude of vibration of a piezoelectric element at any given frequency is approximately proportional to the current through the element, the sensitivity of a piezoelectric motor-amplifier system employing the present invention is substantially independent of temperature.

To obtain the same independence of temperature by the prior art method of using a small series condenser, the condenser would have to have $(A+1)$ times the impedance of condenser 2 or a value of .000495 mfd. The impedance of such a condenser would be 20.2 times the impedance of the crystal at room temperature and 4.05 times the impedance of the crystal at 40° C. Thus the voltage loss at 40° C. would be about 80% of the output of the amplifier, or in other words, the amplifier would have to be capable of supplying about five times the voltage required for operation of the crystal.

On the other hand, by employing the present invention the benefits of a small series condenser are obtained with only negligible loss of output voltage. In the example cited above, the crystal impedance at room temperature is five times the condenser impedance so that the loss in voltage across the condenser is only 1/6 the total amplifier output. At room temperature the crystal has the highest voltage sensitivity so that the whole output of the amplifier is not required and so this small loss is of no importance. At 40° C. the crystal impedance is 25 times the condenser impedance so that the voltage loss across the condenser is only 1/26 of the amplifier output. Thus compared with prior art arrangements for obtaining linearity and independence of temperature, the present invention requires, in the example cited, increased amplifier capacity of only about 4%, while the prior art arrangement requires an increase of amplifier capacity of about 400% over the amplifier capacity required if no temperature compensation is involved.

To avoid excessive loss of amplifier output it is desirable for the capacity of condenser 2 to be at least four times the smallest value of capacity attained by the crystal element. A ratio of 4:1 causes a maximum loss of amplifier voltage output of 20%. Furthermore, the voltage gain A of the amplifier should be high enough so that the capacity of condenser 2 divided by $(A+1)$ is equal to or less than one-fourth the minimum capacity of crystall device 1. Thus, if the capacity of condenser 2 is four times the crystal capacity, the open circuit voltage gain of the amplifier should be at least 15.

Another feature of this invention is that the amplifier impedance measured in absence of feedback may be considerably higher than in the case of conventional circuits without detrimental effect in the frequency response of the system. For example, in devices such as pen recorders it is desirable to have the voltage applied to the crystal 1 at any given temperature (and neglect certain nonlinearities), proportional to the input to the amplifier and independent of frequency. In prior art arrangements it has been necessary to make the amplifier output impedance small compared with the crystal impedance to achieve this condition. When the same crystal device is used in a circuit according to this invention the amplifier is only required to have an impedance low compared with the effective impedance of the feedback condenser $(A+1)/\omega C$. Since this effective impedance is large compared with the crystal impedance it follows that the amplifier impedance may be higher than in the case of conventional prior art arrangements. This is a practical advantage since it often is desirable to employ high impedance output tubes such as pentodes or beam power tubes. In prior art arrangements the impedances of such tubes often are too high for the desired frequency response. This benefit is obtained through the use of the present invention with piezoelectric units that do not have temperature or saturation effects such as units of ammonium dihydrogen phosphate and potassium dihydrogen phosphate as well as with Rochelle salt type units.

A further advantage of this invention is an extension of the useful frequency range of piezoelectric devices, especially devices having a high coupling factor, such as in the case of Rochelle salt devices at room temperature. It has been found that when a piezoelectric device is driven from a high impedance source the mechanical resonance of the device occurs at a higher frequency and is subject to less variation with temperature than when the device is driven from a low impedance source. The output impedance of the amplifier of my invention is high compared with the crystal impedance and hence the higher frequency resonance is obtained. This extension of the useful frequency range is especially noticeable in the case of Rochelle salt devices because of the high coupling factor but is effective also with devices employing other piezoelectric materials.

The signal voltage drop across condenser 2 is proportional to the time integral of the crystal current. The amplitude of vibration of most piezoelectric devices also is proportional to the time integral of this current. Thus the signal voltage across condenser 2 is proportional to the crystal amplitude. This signal voltage may be amplified and applied to an indicator such as a meter or an electron ray indicator for indicating the amplitude of vibration of the piezoelectric device. In the case of a phonograph record cutter such an indicating instrument is most useful to the operator when he is adjusting the signal level to obtain proper record groove amplitude.

The signal voltage across condenser 2 may also be used to actuate an overload protection circuit to prevent damage to the crystal unit in case excessive signal voltage is applied to the system. One way of accomplishing this is to provide a control circuit between the condenser 2 and the grid circuit of an amplifier stage supplying signal voltage to input terminals 8, 9. The control circuit may include an amplifier to amplify the signal voltage across condenser 2 to a level of several volts, and a rectifier circuit including a "delay" bias arranged to prevent rectification for voltages across condenser 2 representing normal signals. The delay bias may be preset to permit conduction through the rectifier whenever the signal current exceeds a predetermined overload value. The output circuit of the rectifier may be connected into the amplifier so that when the crystal amplifier output current tends to be excessive causing a rectified signal to be developed by the rectifier, the amplifier is biased thereby to reduce the gain to prevent the output current to the crystal from rising to a higher value.

Figure 2:
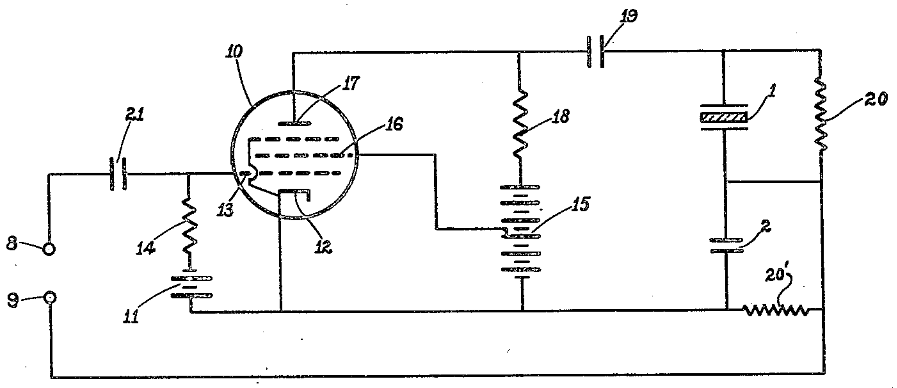
Fig. 2 is a circuit diagram of a single stage amplifier driving a piezoelectric motor device according to this invention.
Figure 3:
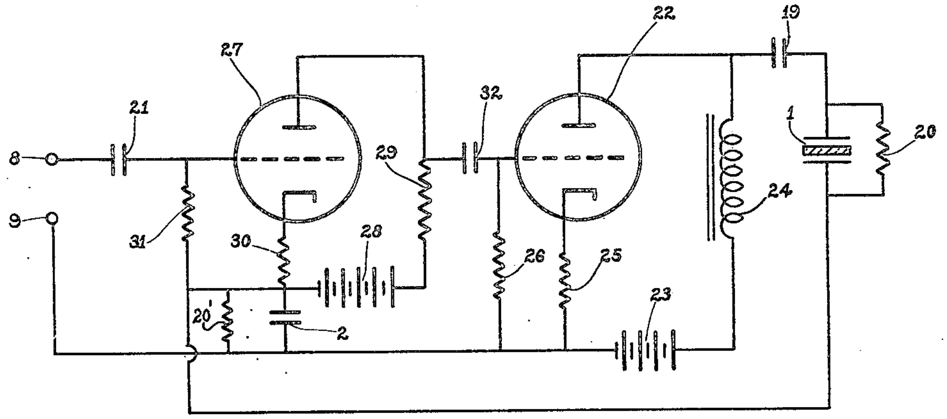
Fig. 3 is a circuit diagram of a two stage amplifier driving a piezoelectric motor device according to this invention.
Figure 4:
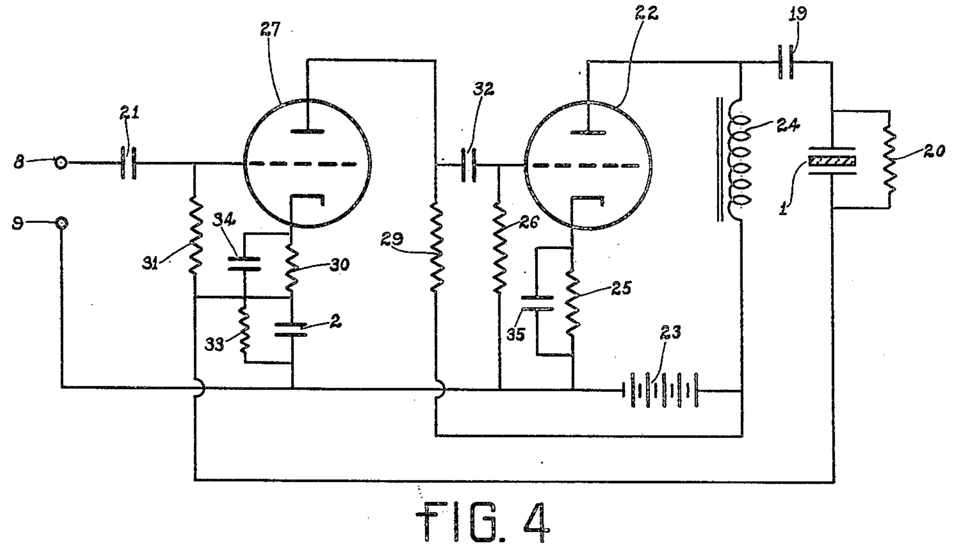
Fig. 4 is a circuit diagram generally similar to Fig. 3 but embodying a slight modification.

Fig. 2 shows an application of this invention to a system employing a single tube amplifier. Vacuum tube 10 preferably is a pentode or beam power tube in order to obtain a large amplification. Its electrode voltages may be supplied in a variety of ways well known to the art. For convenience, separate batteries are shown. The negative grid bias is provided by battery 11 connected with its positive terminal to cathode 12 and with its negative terminal to control grid 13 through high resistance 14. Battery 15 has its negative terminal connected to cathode 12 and a positive tap connected to screen grid 16. The positive side of the battery is connected to the plate 17 through plate load resistance 18. The output of the tube is developed between the plate 17 and cathode 12, resistance 18 being large enough so that it does not unduly load the tube and small enough to supply the required plate current and to stabilize the circuit impedance at a value that provides approximately linear operation of the tube. A high degree of linearity in the amplifier is not required because the feedback from condenser 2 tends to make the time integral of the crystal current proportional to the input voltage even though the tube tends to introduce some distortion. The crystal device 1 and feedback condenser 2 are connected in series between plate and cathode with an intervening blocking condenser 19 to prevent the application of plate supply voltage to the crystal. Preferably the capacity of condenser 19 should be large compared with that of crystal 1 so that it will cause negligible signal voltage drop. Resistance 20 is shunted across crystal 1 to remove any D. C. charge that may tend to build up on its electrodes when the system is turned on or due to leakage across condenser 19. Resistance 20 should be large compared with the reactance of crystal 1 over the useful frequency range of the system. Input terminal 8 is connected to grid 13 through blocking condenser 21 and the input terminal 9 is connected to the junction of crystal 1 and condenser 2. Resistance 20' is shunted across condenser 2 to bring the electrodes of crystal 1 and the input terminal 9 to the D. C. potential of cathode 12. Grid resistance 14 should be large compared with the reactance of condenser 2 over the useful frequency range of the system and the reactance of condenser 21 should be small compared with resistance 14. The action of the circuit of Fig. 2 is as described in connection with Fig. 1. The reduction in sensitivity to temperature change and the improvement in linearity obtained with this simple circuit may be limited by the inability to obtain sufficient amplification with a single tube. Furthermore, any input signal source which may be connected to input terminals 8 and 9 must be isolated from the negative side of plate supply 15 to avoid short circuiting condenser 2, thus making it impractical to ground both the signal source and the plate supply. For these reasons further elaboration of the circuit often is desirable. Fig. 3 shows an arrangement involving a two-stage amplifier and providing enough amplification for very great improvement of linearity and reduction of temperature dependence. Output tube 22 is shown as a triode but obviously other tubes such as a pentode could be used. Plate supply 23 supplies plate current through plate supply choke coil 24. Grid bias is provided by the voltage drop across cathode resistance 25, the control grid being connected to the negative side of resistance 25 through grid resistance 26. The signal output of tube 22 except for a small signal drop across resistance 25 is applied to crystal 1 and feedback condenser 2 in series, with blocking condenser 19 intervening to avoid application of D. C. plate voltage to the crystal. Discharge resistance 20 is connected across the crystal and resistance 20' is connected across condenser 2 to keep the two stages at substantially the same D. C. potential. Plate current for the first stage amplifier tube 27 is supplied from a separate source 28 through plate resistance 29 and cathode resistance 30. Grid resistance 31 is connected between the grid of tube 27 and the negative side of resistance 30 so that the voltage drop across resistance 30 provides bias for the tube. The output of tube 27 except for a small voltage drop across cathode resistance 30 is applied to the input of tube 22. Coupling condenser 32 prevents the application of improper bias to the grid of output tube 22. Grid resistance 26 should be large compared with the reactance of condensers 2 and 32 and grid resistance 31 should be large compared with the reactance of condenser 2. Input terminal 8 is connected to the grid of input tube 27 through blocking condenser 21. Input terminal 9 is connected to the junction between condenser 2 and the negative side of plate supply 23. In the circuit of Fig. 3 the signal output current from the plate of tube 22 flows through crystal 1 and condenser 2 back to the cathode of tube 22, plate supply choke 24 having sufficient reactance to take a negligible part of the output signal current. The signal voltage drop across condenser 2 is in series with the input to tube 27. Thus the action is substantially the same as in Fig. 2 except that greater amplification is available. Separate plate supplies are required to avoid short circuiting condenser 2. Input terminal 9, however, is connected to the negative side of plate supply 23 so that both the input signal source and the supply 23 may be grounded without interfering with the operation of the circuit. This leaves supply 28 "off ground" but generally the supply to a voltage amplifier tube such as 27 may be relatively small so that an isolated supply may be provided without undue expense and difficulty. For example, a small battery of the type commonly used in portable radio receivers may be employed. Alternatively the supply may be derived from a vacuum tube oscillator working at a frequency well above the range of the crystal and a rectifier with a simple RC filter. If the frequency range of the system is not required to extend down to very low frequencies, the circuit of Fig. 3 may be modified for operation from a single plate supply as shown in Fig. 4. In Fig. 4 the battery 28 of Fig. 3 is omitted and resistance 29 is connected to the positive side of supply 23. To complete the plate cathode circuit of tube 27, a high resistance 33 is connected across condenser 2. Resistance 33 must be large compared with the reactance of condenser 2 over the useful frequency range yet must not be so large as to cause excessive loss of plate voltage at tube 27. This makes it desirable to use a tube 27 requiring small plate current and to make condenser 2 as large as practical. This in turn makes it desirable to have as much amplification as possible to obtain high effective impedance from the low impedance condenser 2. To obtain more amplification by pass condensers 34 and 35 are shunted across cathode resistances 30 and 25 respectively. The circuit of Fig. 4 has the advantage that the input terminal 9 and the plate supply 23 both may be grounded and that no separate off-ground supply is required for the first stage. It has the disadvantage that resistance 33 shunting condenser 2 limits the low frequency operation to frequencies higher than in the case of Figs. 2 and 3. In some cases it may be desirable to replace resistance 33 by a large inductance coil. This will reduce the loss of plate supply voltage. On the other hand, the inductance limits the low frequency operation of the system and furthermore, resonates with condenser 2. The resonance frequency should be placed below the useful frequency range of the system and preferably should be damped, for example by the use of a low Q coil.

When choke feed is used as in Figs. 3 and 4 or when the crystal and feedback condenser are coupled to the output tube through a transformer there is a tendency to develop a resonance peak at some frequency depending on the load capacity and the inductance of the coil or transformer. When triode output tubes are used, the plate resistance thereof usually will be sufficiently low to damp the system adequately. When high impedance tubes such as pentode or beam power output tubes are used however, it may be desirable to introduce additional resistance in the form of a resistance shunted across the choke coil or across one or both windings if a transformer is used. Alternatively the choke coil or transformer may be constructed with iron lamination of greater than usual thickness so that the effective shunt resistance resulting from eddy current losses is sufficiently low to load the output tube.

Figure 5:
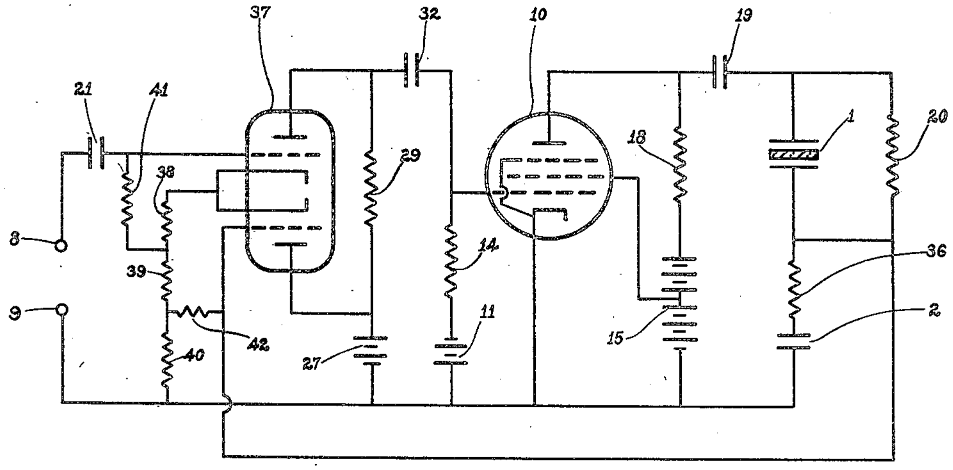
Fig. 5 is a circuit diagram of a form of this invention providing frequency response correction.

Fig. 5 shows another circuit arrangement involving high amplification, permitting the use of a single plate supply and permitting operation at relatively low frequencies. In addition to providing linear operation of the crystal device and independence of temperature the circuit of Fig. 5 is arranged to introduce frequency response correction such as may be desired in the operation of a crystal phonograph record cutter. The electrode voltages of output tube 10 are supplied in the same manner as in Fig. 2. Crystal 1 is connected in series with feedback condenser 2 and resistance 36 across the output of tube 10 with blocking condenser 19 and discharge resistance 20 provided for the purposes explained in connection with previous figures. Input for tube 10 is obtained from the output of one section of a dual triode 37. A separate plate supply 27 for tube 37 is shown for convenience. Obviously, however, supply 15 could be used. The other section of dual triode 37 is connected as a cathode follower, the plate being connected to the positive side of supply 27. Resistances 38, 39 and 40 are connected in series between the cathodes of the two sections of tube 37 and the common point of the circuit. Grid bias for the upper section of tube 37 is obtained through the connection of resistance 41 between the grid and negative side of resistance 38. Bias for the cathode follower section is obtained by the connection of resistance 42 between the grid and negative side of resistance 39. The signal voltage developed across condenser 2 and resistance 36 in series by the flow of crystal current through said elements is applied to the cathode follower grid. Grid resistance 42 should be large and its effect is that of a still larger resistance due to the cathode follower action so that it does not effectively shunt condenser 2 except at extremely low frequencies. The cathode follower develops between its cathode and the common side of the circuit a signal voltage substantially equal to and in phase with the feedback voltage developed across condenser 2 and resistance 36. Because of the common cathode connection, this feedback voltage is in series with the input applied by the terminals 8 and 9 to the grid and cathode of upper triode 37. In principle, the action of the circuit in Fig. 5 is the same as that of the previous figures except that the frequency response of the system is altered by the presence of resistance 36. The amplification of the system is less than the normal two-stage amplifier because of the inverse feedback. As the impedance of crystal 1 rises due to an increase of temperature, the current through the crystal tends to be reduced. This tends to reduce the feedback voltage developed across the condenser 2 and resistance 36, and thus tends to reduce the feedback voltage developed across cathode resistances 38 and 39 and 40. This in turn permits a larger part of the input signal between terminals 8 and 9 to be developed between the grid and cathode of the upper part of dual triode 37 so that a greater signal is applied to the input of tube 10 and this tends to increase the current supplied to the crystal to compensate for the current reducing effect of the increase in temperature. At low frequencies the effect of resistance 36 is negligible and condenser 2 therefore is the controlling impedance. At higher frequencies the impedance of condenser 2 becomes negligible compared with resistance 36 and thus the resistance becomes the controlling circuit impedance. In the recording of phonograph records it is common practice to employ "constant amplitude" recording for frequencies up to about 500 cycles and "constant velocity" recording for frequencies above 500 cycles. For such service resistance 36 would be made equal to the reactance of condenser 2 at 500 cycles. It will be understood, of course, that resistance 36 may be omitted if "constant amplitude" response over the entire frequency range is desired. Furthermore, it will be understood that resistance 36 could be employed in other modifications of this invention to obtain a comparable frequency response correction.

Figure 6:
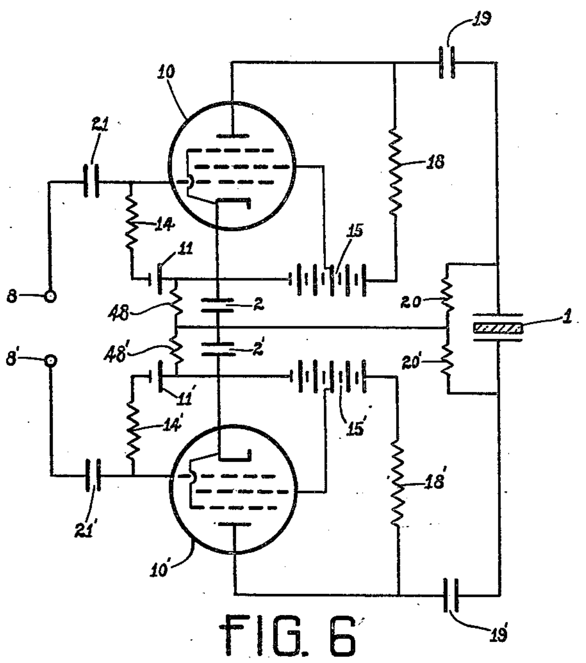
Fig. 6 is a circuit diagram illustrating a single stage push pull amplifier arranged to drive a piezoelectric motor device according to this invention.

Fig. 6 illustrates one way in which this invention may be utilized in connection with a single stage push pull amplifier. The amplifier consists merely of two amplifiers of the type shown in Fig. 2 connected together so that the output current path is from the plate of tube 10 through blocking condenser 19, through the crystal device 1, through blocking condenser 19', through tube 10', through feedback condensers 2', 2 and through tube 10. The input signal is applied between the grids of tubes 10, 10'. Feedback condensers 2, 2' are in series between the cathodes of the tubes and therefore are in series with the input circuit as well as in series with the output circuit. The action of the circuit is essentially the same as that of Fig. 2. The amplifier requires two plate suppliers to prevent short circuiting the feedback condensers 2, 2'.

Figure 7:
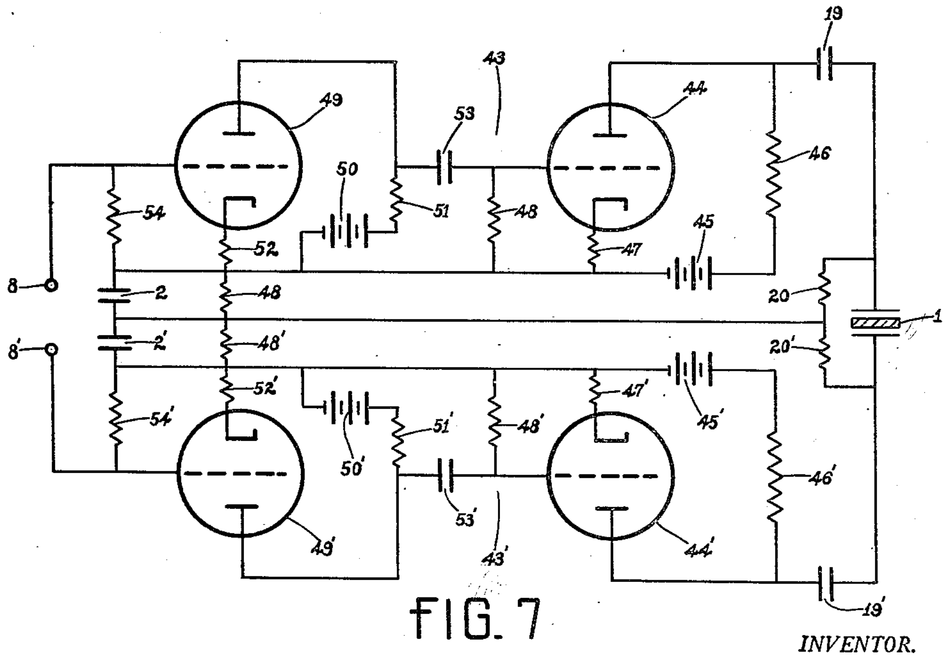
Fig. 7 is a circuit diagram of a two stage push pull amplifier arranged to drive a piezoelectric motor device according to this invention.

Fig. 7 illustrates one way of applying this invention to a two-stage push pull amplifier. It consists of two single ended two stage amplifiers 43, 43' connected together so that the output circuits are in series and the input circuits are in series with feedback condensers common to the input and output. The output tubes 44, 44' are shown as triodes and as in the case of the other circuits illustrated, other types of tubes can be used. Plate supplies 45, 45' shown for convenience as batteries, supply plate current for tubes 44, 44' through plate coupling resistances 46, 46' and bias resistances 47, 47'. Grid resistances 48, 48' are connected between the grids and the negative sides of resistances 47, 47', to establish the required negative grid bias. Crystal device 1 is connected to the plates of tubes 44, 44' through blocking condensers 19, 19'. The signal output current follows the path from plate of tube 44 through blocking condenser 19 through crystal 1 through blocking condenser 19' through tube 44' through cathode resistance 47' through feedback condensers 2', 2 through cathode resistance 47 and back through tube 44. The resistances 20, 20' are direct current discharge paths for the crystal device 1 and resistances 48, 48' are discharge paths for condensers 2, 2'. The first stage tubes 49, 49' are shown with separate plate supplies 50, 50' but the supplies 45, 45' could as well be used. Plate coupling resistances 51, 51' and cathode resistances 52, 52' complete the plate current circuits. Condensers 53, 53' connect the output of tubes 49, 49' to the grids of tubes 44, 44'. Grid resistances 54, 54' are between grids of tubes 49, 49' and the negative sides of cathode resistances 52, 52' to establish the required negative bias for the grids. The input from terminals 8, 8' is applied between grids and it will be noted that feedback condensers 2, 2' are in series with the input. Thus the crystal current flows through condensers 2, 2', develops voltage across the condenser which opposes the input signal and the action is essentially the same as in the other figures.

In the arrangements of Figures 6 and 7 at least two separate plate supplies are required or else direct current carrying shunts must be connected across the feedback condensers introducing difficulties as to low frequency response as described in connection with Fig. 4.

Figure 8:
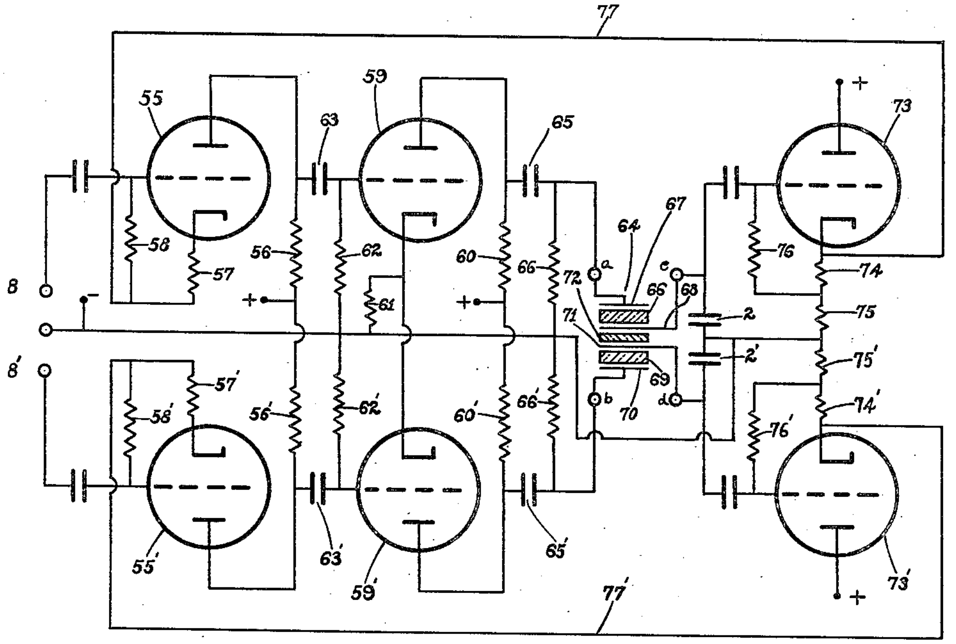
Fig. 8 is a circuit diagram of a push pull amplifier driving a piezoelectric unit of novel construction according to this invention.

Fig. 8 shows a push pull amplifier arrangement permitting the use of a single plate supply without imposing extra limitations on the frequency response. The first stage comprises tubes 55, 55', plate resistances 56, 56', cathode bias resistances 57, 57' and grid resistances 58, 58'. The output stage comprises tubes 59, 59', plate coupling resistances 60, 60', common cathode bias resistance 61 and grid resistances 62, 62'. The two stages are coupled by condensers 63, 63'. The plates of output tubes 59, 59' are connected to the crystal device 64 through blocking condensers 65, 65'. Resistances 66, 66' provide discharge paths for the crystal device. The crystal device 64 is of novel construction permitting its use in a push pull amplifier having a common plate supply. The crystal device 64 may be constructed in a variety of ways. The essential requirement being that it comprise two substantially equal electroded parts that may be connected electrically in series and that contribute substantially equally to the mechanical forces developed, when the two halves are equally excited electrically. For example, it may be a multiplate flexing unit of the general type described in Sawyer Reissue Patents Re. 20,213 and Re. 20,680 and sold under the registered trade-mark, "Bimorph" but with modifications as described below. One crystal plate 66 is provided with outer electrode 67 and inner electrode 68 and another crystal plate 69 is provided with outer electrode 70 and inner electrode 71. Each electrode is provided with a lead extension and the four lead extensions are connected to terminals *a*, *b*, *c*, *d*. The plates are cemented together in opposed electrostatic relationship as more fully described in the reissue patents. The unit differs from the Sawyer construction in that a thin layer of insulating material 72 is disposed between electrodes 68, 71 of plates 66, 69 respectively, so that the two plates are electrically insulated from each other. Across terminals *c*, *d*, that is, across electrodes 68, 71, are connected two feedback condensers 2, 2'. The signal output current from tubes 59, 59' flows through blocking condenser 65 through crystal plate 66 via terminals *a* and *c*, through feedback condenser 2, 2', through crystal plate 69 via terminal *d* and *b*, through blocking condenser 65' and through tube 59' to tube 59. It will be observed that the feedback capacity 2, 2' is connected in series between crystal plates 66, 69. Thus the element may be the same as common series connected multi-plate elements except that the inner electrodes are insulated from each other. The feedback voltage developed across condensers 2, 2' is applied to the grids of tubes 73, 73' connected as cathode followers. The D. C. plate current path for tube 73 is from B+ through tube 73 through resistance 74 and 75 to B−. Grid resistance 76 is connected to the negative side of resistance 74 to establish correct grid bias. Tube 73' is similarly connected. Resistances 76, 76' should be large compared with the impedances of condensers 2, 2'. Between the cathode of tube 73, 73' is developed a signal voltage substantially equal to and in phase with the feedback voltage across condenser 2, 2' and this voltage is in series with the input to tubes 55, 55' by virtue of the connections 77, 77'. Thus as in the other circuits the crystal current flows through feedback condensers developing a voltage which opposes the input voltage to reduce the gain of the system. As the crystal current tends to decrease, for example, due to a change in temperature, the feedback voltage decreases correspondingly so that more of the input signal between input terminals 8, 8' is effective between grids and cathodes of tubes 55, 55', thus tending to increase the output to counteract the effect of increased crystal impedance.

The insulating layer 72 between electrodes 68, 71 of the crystal element 64 may be a thin sheet of mica, paper or the like or it may be merely an insulated film applied before cementing the electroded crystal plates together or it may be the cement itself. A convenient material for the insulating layer 72 is a thin plate of the same crystalline material as used in plates 66, 69 but oriented so as to be piezoelectrically inactive or only slightly active. For example, plates 66, 69 may be X cut plates of Rochelle salt. The plate 72 may then be a Y cut or a Z cut plate of Rochelle salt, which plates have small piezoelectric activity compared with the X cut plates. Alternately plate 72 could be a X cut plate of Rochelle salt preferably oriented with respect to the Y and Z axes at an angle of 45° to the orientation of plates 66, 69. An advantage in using the same material for all plates is that the coefficients of thermal expansion are substantially the same, reducing the tendency to develop internal stresses when the temperature of the unit changes. In any event, the layer 72 and electrodes 68 and 71 form a condenser which shunts condensers 2, 2' and therefore some of the crystal current flows through this condenser. Generally, the capacity of this condenser is too low to have any important effect but in some cases it may be high enough so that condensers 2, 2' may be omitted. If the capacity of plate 72 comprises all or a substantial part of the total feedback capacity, then the temperature dependence of the dielectric constant of plate 72 must be taken into account and generally it will be desirable to avoid plates such as X cut Rochelle salt plates.

Figure 9:
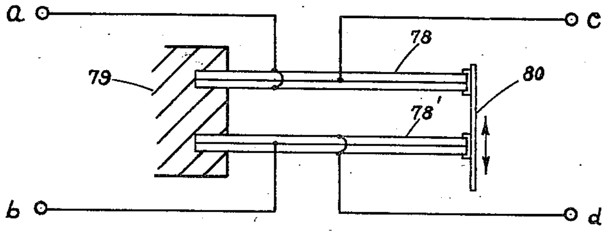
Fig. 9 illustrates another form of the novel piezoelectric units that may be used in the circuit of Fig. 8.

Fig. 9 illustrates an example of another way of constructing a piezoelectric unit for use in push-pull circuits exemplified by the circuit of Fig. 8. In the form shown, two similar multiplate flexing elements 78, 78' are secured to a common support 79 and connected at their free ends to a common drive member 80. In the form shown, the elements are of the bending type and reference may be had to Sawyer Reissue Patent 20,213 for a description of such bending type elements. Alternatively, the elements could be of the twisting type described in Sawyer Patent Re. 20,680. The drive member 80 may be connected to an acoustic or other member to be actuated by the crystal elements. Terminal *a* is connected to the outer electrodes of unit 78 and terminal *b* is connected to the inner electrode of unit 78'. Terminals *c* and *d* are connected, respectively, to the inner electrode of element 78 and the outer electrodes of element 78'. Thus when the double element assembly of Fig. 9 is connected into the circuit of Fig. 8 in place of element 64, the two elements 78, 78' are electrically in series across the output of amplifier tubes 59, 59' with the feedback condensers 2, 2' connected in series between the two piezoelectric elements. The two elements, therefore, receive the same alternating current from the amplifier and since they are similar in construction they contribute substantially equally to the driving force applied to the drive member 80.

Figure 10:
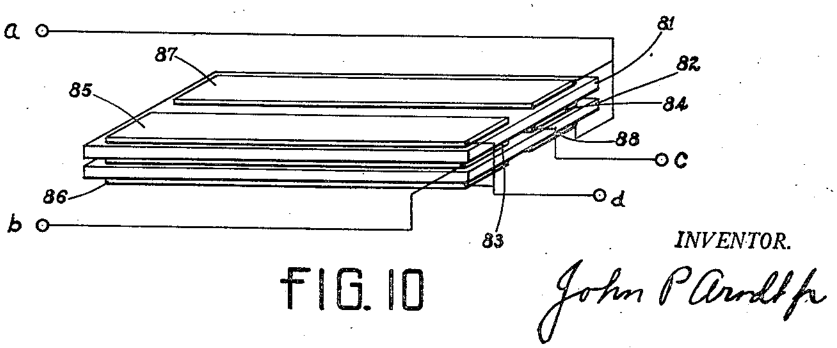
Fig. 10 illustrates still another form of the novel piezoelectric units that may be used in the circuit Fig. 8.

Fig. 10 illustrates an example of still another way of constructing a piezoelectric unit for use in circuits such as that of Fig. 8. It comprises a pair of similar piezoelectric plates 81, 82, cemented together with similar intervening electrodes 83, 84. Outer electrodes 85, 86, 87, 88 are secured to the outer faces of the assembly substantially in register with inner electrodes 83, 84. Outer electrodes 87, 88 are connected together to terminal $a$. Inner electrode 84 is connected to terminal $c$. Outer electrodes 85, 86 are connected together to terminal $d$, and inner electrode 83 is connected to terminal $b$. When the element is connected into the circuit of Fig. 8, the signal current follows the path from output tube 59 through terminal $a$ to electrodes 87, 88, from electrode 84 to terminal $c$, from terminal $c$ through feedback condensers 2, 2′ to terminal $d$, from terminal $d$ to electrodes 85, 86 and thence from electrode 83 to output tube 59′ through terminal $b$. The two sets of electrodes 87, 88, 84 and 85, 86, 83 demark two equal portions of the piezoelectric unit, which portions are electrically connected in series with the feedback condensers 2, 2′ between the two portions. The orientation of the plates and the electrodes and the connections to the electrodes are such that the two portions of the elements develop equal piezoelectric forces when an actuating current is passed through terminals $a$, $b$ by the amplifier circuit. The orientation of the plates may be such that the combination forms a bending unit generally similar to those described in Sawyer Patent Reissue 20,213 or the orientation may be such that a twisting unit is formed generally similar to that described in Sawyer Patent Reissue 20,680. Alternatively, instead of employing an orientation that produces flexing, the plates may be orientated with respect to each other so that both expand or contract simultaneously in the same direction or both execute similar simultaneous shearing motions, the action of the assembly then being analogous to that described in Sawyer Patent 1,802,781 with reference to a single expander plate or that described in Sawyer Patent 1,802,780 with reference to a single shear plate. The particular choice of plate orientation and electrode disposition will depend on the particular requirements of the design, the considerations being the same as employed in prior piezoelectric devices except that the electrodes are divided into two pairs and the element is employed in a way that enables the two electroded portions to contribute substantially equally to the operation of the device.

It will be recognized that other modifications of the "split series" element construction may be employed for use in this invention. For example, in Fig. 10, piezoelectric plate 82 and its outer electrodes 86 and 88 could be omitted leaving a single expander or shear plate suitable for use in the circuit of Fig. 8.

Figure 11:
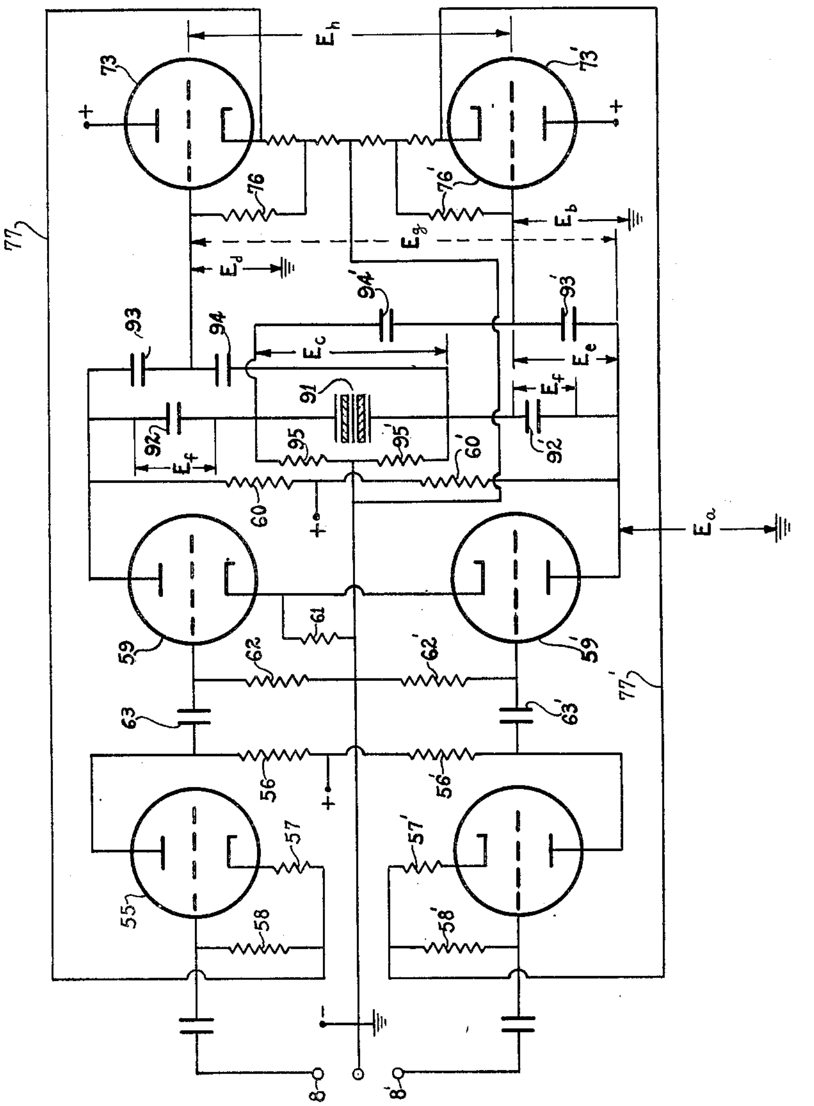
Fig. 11 illustrates a push pull amplifier adapted for use according to this invention with a piezoelectric unit of conventional design.

Fig. 11 shows a modification of the invention enabling the use of a conventional piezoelectric element in a push pull circuit. Except for the crystal element 91 and circuit components immediately associated therewith, the circuit is similar to that of Fig. 8 and the similar elements are identified by the same reference characters used in Fig. 8. The piezoelectric element 91 may be the element of any piezoelectric motor device but is shown in Fig. 11 as a series connected multiplate element. The piezoelectric element 91 is connected to the output circuit of tubes 59, 59′ through two equal feedback condensers 92, 92′. The grid of cathode follower feedback tube 73 is connected to the midpoint of a 2:1 voltage divider comprising two equal condensers 93, 94 which are connected between the plate of output tube 59 and the junction between crystal element 91 and feedback condenser 92′. The grid of cathode follower feedback tube 73′ is similarly connected to the midpoint of a capacity voltage divider comprising equal condensers 93′, 94′ connected between the output of plate 59′ and the junction between the piezoelectric unit 91 and feedback condenser 92. Condensers 93, 93′, 94, 94′ are equal and preferably much smaller in capacity than the lowest capacity attained by the piezoelectric unit 91 throughout its useful temperature range. Grid leaks 76, 76′ preferably should be large compared with the impedance of said condensers at the lowest frequency of operation of the piezoelectric unit. However, some leeway in this matter is possible because the degeneration in the cathode follower circuit of tubes 73, 73′ reduces the loading effect of the grid leak 76, 76′. Discharge resistances 95, 95′ are connected between the terminals of the piezoelectric element and the common point in the circuit. In place of the condensers 93, 93′, 94, 94′ resistance voltage dividers could be used, suitable blocking condensers being provided to prevent disturbing the bias voltages on cathode follower tubes 73, 73′ if the design is such that the grid potentials should be different than the plates of output tubes 59, 59′. The arrangement of the circuit elements associated with the crystal element 91 is such that in operation the signal voltage applied between the grids of the cathode follower tubes 73, 73′ is substantially only the voltage drop of one feedback condenser 92, 92′, the voltage drop across the piezoelectric unit 91 cancelling out. This can be illustrated by a simple mathematical treatment in which it is assumed that the signal currents in condensers 93, 93′ and in discharge resistances 95, 95′ are small compared with the signal current through feedback condensers 92, 92′. In this analysis the signal voltage between the plate of output tube 59′ and ground is denoted by $E_a$, the voltage between the grid of cathode follower 73′ and ground is denoted by $E_b$, the voltage between the grid of cathode follower 73 and ground is denoted by $E_d$, the voltage across each of the feedback condensers 92, 92′ is denoted by $E_f$, the voltage across the crystal element 91 is denoted by $E_c$, the voltage from the plate of output tube 59′ to grid of cathode follower 73′ is denoted by $E_e$, the voltage between the plate of output tube 59′ and grid of cathode follower 73 is denoted by $E_g$ and the voltage between the grids of the cathode followers 73, 73′ is denoted by $E_h$. The impedances of the various elements will be denoted by X with the subscripts assigned to the particular element, thus the impedance of condenser 93′ is denoted by $X_{93'}$. From inspection of the circuit the following relationships can be set down:

$$E_e=\frac{X_{93'}}{X_{93'}+X_{94'}}(E_c+E_f)=\frac{1}{2}(E_c+E_f) \tag{12}$$

$$E_g=E_f+\frac{X_{94}}{X_{93}+X_{94}}(E_c+E_f)=E_f+\frac{1}{2}(E_c+E_f) \tag{13}$$

$$E_h=E_g-E_e \tag{14}$$

Substituting $E_e$ and $E_g$ from Equations 12 and 13 into Equation 14:

$$E_h=E_f \tag{15}$$

Equation 15 shows that the signal voltage between the grids of the cathode followers is free of any component of voltage drop across piezoelectric device 91 and is equal only to the voltage drop across one of the feedback condensers.

The output of the cathode followers is supplied degeneratively to the amplifier input through connections 77, 77′ as described in connection with Fig. 8 to force the time integral of crystal current to be substantially proportional to the amplifier signal input voltage and substantially independent of the crystal temperature.

Although numerous modifications of the invention have been described in the above specification, many other circuit combinations and crystal element constructions are possible without departing from the spirit and scope of the invention. It will therefore be understood that the specification and the accompanying drawings are to be considered as illustrative and, accordingly, the scope of the invention should be determined from the following claims.

What is claimed is:

1. In combination, a piezoelectric transducer unit comprising two piezoelectric portions each provided with a pair of electrodes and adapted to vibrate in response to alternating potentials applied to its electrodes, said piezoelectric portions being mechanically coupled to each other for substantially equal and aiding mechanical activities when the two electroded portions are electrically connected in series; condenser means; a push-pull amplifier for supplying signal currents to the piezoelectric unit in response to signal voltages applied to the amplifier and having an input circuit and an output circuit including in series sequence one of the piezoelectric portions, said condenser means and the other piezoelectric portions; and a feedback path between the condenser means and the input circuit for delivering to the input circuit a degenerative feedback voltage.

2. The combination set forth in claim 1, further characterized by said piezoelectric transducer unit comprising two superimposed plates of dielectric material each having a mutual coupling action as between an electric field in the plate and a mechanical activity in the plate; a plurality of electrodes for each of said plates; means for effectively providing, during operation of said device, potentials of opposite polarity between adjacent electrodes of each of said plates and a mechanical activity of opposite sign between said plates; and insulating means between said plates which is effective to couple mechanically said plates.

JOHN P. ARNDT, JR.

REFERENCES CITED

The following references are of record in the file of this patent:

UNITED STATES PATENTS

| Number | Name | Date |
|---|---|---|
| 2,249,305 | Ando | July 15, 1941 |
| 2,328,478 | Mason | Aug. 31, 1943 |
| 2,368,609 | Burkhardt | Jan. 30, 1945 |
| 2,372,956 | Jordan | Apr. 3, 1945 |